United States Patent Office 3,166,590
Patented Jan. 19, 1965

3,166,590
POLYMERS OF THE BETA-(N-AZIRIDINO) ALCOHOLS
Kwan C. Tsou, Huntingdon Valley, Pa., assignor to The Borden Company, New York, N.Y., a corporation of New Jersey
No Drawing. Filed July 29, 1960, Ser. No. 46,064
3 Claims. (Cl. 260—570.5)

This invention relates to polymers of beta-(N-aziridino) alcohols and the process of making them.

An example is the polymer of the beta-(N-aziridino) ethanol, this monomer being of the formula

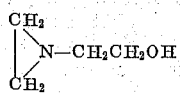

In general the invention comprises polymers of the following formula

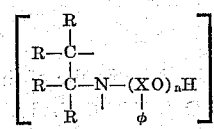

in which the various R's represent the same or different monovalent components selected from the group consisting of hydrogen and $C_1$–$C_4$ alkyls, X is a bivalent group consisting of carbon and hydrogen having therein 2–8 carbon atoms, $n$ is an integral number that for best results is within the range 1–10, and $y$ is an integer that is at least 2 and normally about 3–50.

The process of the invention is the maintaining of the monomer of kind described at a pH below 7 until the exothermic reaction that ensues is substantially completed as shown by a drop in the temperature from the maximum reached during the polymerization.

In the polymerization of the monomer it is considered that the active aziridino group

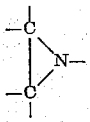

opens the bond between one of the carbon atoms and the nitrogen and then unites with the other like groups substantially as shown in the equation that follows:

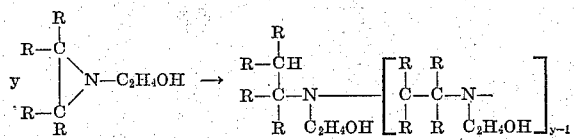

and in which the several R's, $n$, and $y$ have the same meanings as above, X here being $C_2H_4$.

As the organic oxide that is reacted with the selected imine to make the products of this invention, I use ordinarily ethylene oxide, but may use other alkylene oxides, i.e., organic oxides having therein the ring structure

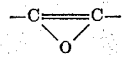

Examples of such other oxides that I may use are propylene, butylene, styrene and beta-phenylethylene oxides.

The imine used in this reaction is of the general formula that follows.

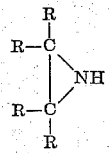

R here has the meaning given above. Examples of the imines that are used to supply this reactant are ethylenimine which is the preferred material, 2-methylethylenimine, 2,3-dimethylethylenimine and the corresponding ethyl, propyl, and butyl substitution products of ethylenimine.

MAKING THE MONOMERS

I use 1–10 moles of the organic oxide of kind described to 1 of the imine.

The process is as follows: I mix the two, ordinarily in about equimolecular proportions, in the cold and maintain them in contact with each other until the reaction is substantially complete and then distil and fractionate the various components. To make the derivative of ethanol, for example, I introduce 36 grams of ethylene oxide (0.82 mole) in liquid condition slowly into 30 grams (0.7 mole) of ethylenimine at 0°–5° C., in the course of 6 hours. The solution was cooled externally to −10° C. and maintained there for 12 hours. The resulting mixture was then distilled, the forerun discarded and a main fraction collected and redistilled, the fraction collected at boiling at 65°–67° C. at 12 mm. pressure and the yield being 10 grams of beta-(N-aziridino) ethanol.

In a modification of this general method, the desired oxide, such as ethylene oxide, was cooled with external ice and introduced slowly into 102 parts of the ethylenimine maintained at about −10° C. until 1 mole of the ethylene oxide had been absorbed as shown by the gain in weight of 44 parts. After the mixture had stood overnight, the ethylene oxide was again passed in, as above, the temperature being maintained until the total gain in weight was theoretical. This slow, final introduction was performed over three consecutive days. The product was then distilled under high vacuum at a temperature of 20°–80° C. at 1–0.5 mm. The distillate was redistilled, the fraction which was accepted boiling at 65°–67° C. at 12 mm. pressure.

In making the other aziridino alcohols, there is used the imine whose radical is to appear in the final product and the organic oxide which, with a hydrogen added, is to constitute the alcohol group in the final product, this hydrogen coming as shown from the hydrogen initially joined to nitrogen in the imine used.

MAKING POLYMERS

The polymerization is effected by warming the monomer until a viscous product results and discontinuing the heating before the product gels, i.e., until the exothermic reaction subsides. The invention is illustrated by the following specific examples. In these examples and elsewhere herein proportions are expressed as parts by weight unless specifically stated to the contrary.

Example 1

The beta-(N-aziridino) ethanol monomer, made from ethylenimine and ethylene oxide as described above, was sealed in a glass ampoule under a carbon dioxide atmosphere and heated at 50°–60° C. for 1 hour. A colorless yellow viscous oil resulted. It was a polymer soluble in methanol and in water. It was strongly adherent to glass and curable by heating, as at 70°–100° C. and more slowly at room temperature, without adding any curing agent.

The product is useful as impregnating material in paper to improve the strength.

Example 2

Beta-(N-aziridino) ethanol resulting from the reaction of ethylenimine with ethylene oxide as described was mixed with an equal proportion of additional ethylenimine. Hydrochloric acid solution, in amount to provide about 92% of aqueous HCl on the total weight, was then added as catalyst.

A viscous polymeric oil was formed almost immediately.

Example 3

The procedure of Example 2 was used except that the hydrochloric acid as catalyst of curing was replaced by a drop of chlorohydrin. The result was an oily polymer.

Example 4

The procedure of Example 1 is followed except that the monomer made from ethylenimine and ethylene oxide and there used is replaced, in turn, by the monomeric product of the action of any one of the other imines with ethylene oxide.

Example 5

The procedure of each of the Examples 1–4 is followed except that the monomer there used is replaced by the monomeric reaction product of the selected imine with any of the alkylene or phenyl alkylene oxides disclosed herein, in the proportion of 1–10 moles of the organic oxide to 1 of the imine.

The products made as described when used to bond paper to glass gave a strong bond. The products are useful also in aqueous solutions of concentration 10% or more as adhesives.

It will be understood that it is intended to cover all changes and modifications of the examples of the invention herein chosen for the purpose of illustration which do not constitute departures from the spirit and scope of the invention.

I claim:

1. A liquid polymer of a beta-(N-aziridino) alcohol of the formula

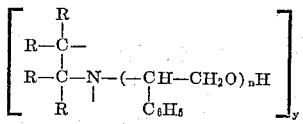

in which the several R's represent monovalent components selected from the group consisting of hydrogen and $C_1$–$C_4$ alkyls, $n$ is an integral number within the range 1–10, and $y$ is an integer within the range 2–50.

2. The process of making a polymer which comprises warming a monomer, of the general formula

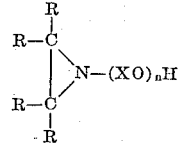

in which the several R's represent monovalent components selected from the group consisting of hydrogen and $C_1$–$C_4$ alkyls, X is a bivalent group consisting of carbon and hydrogen and having 2–8 carbons therein, and $n$ is an integral number within the range 1–10, at a pH below 7 until the exothermic reaction that ensues is substantially completed.

3. The process of claim 2 in which X is

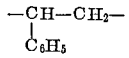

References Cited in the file of this patent

UNITED STATES PATENTS

| | | |
|---|---|---|
| 2,475,068 | Wilson | July 5, 1949 |
| 2,626,931 | Bestian | Jan. 27, 1953 |

OTHER REFERENCES

Noller: Chemistry of Organic Compounds, W. B. Saunders Co., Philadelphia, Pa., 1956, page 696 relied upon.

Funke et al.: Chemical Abstracts, vol. 49, page 1556 (1955).